Patented July 10, 1923.

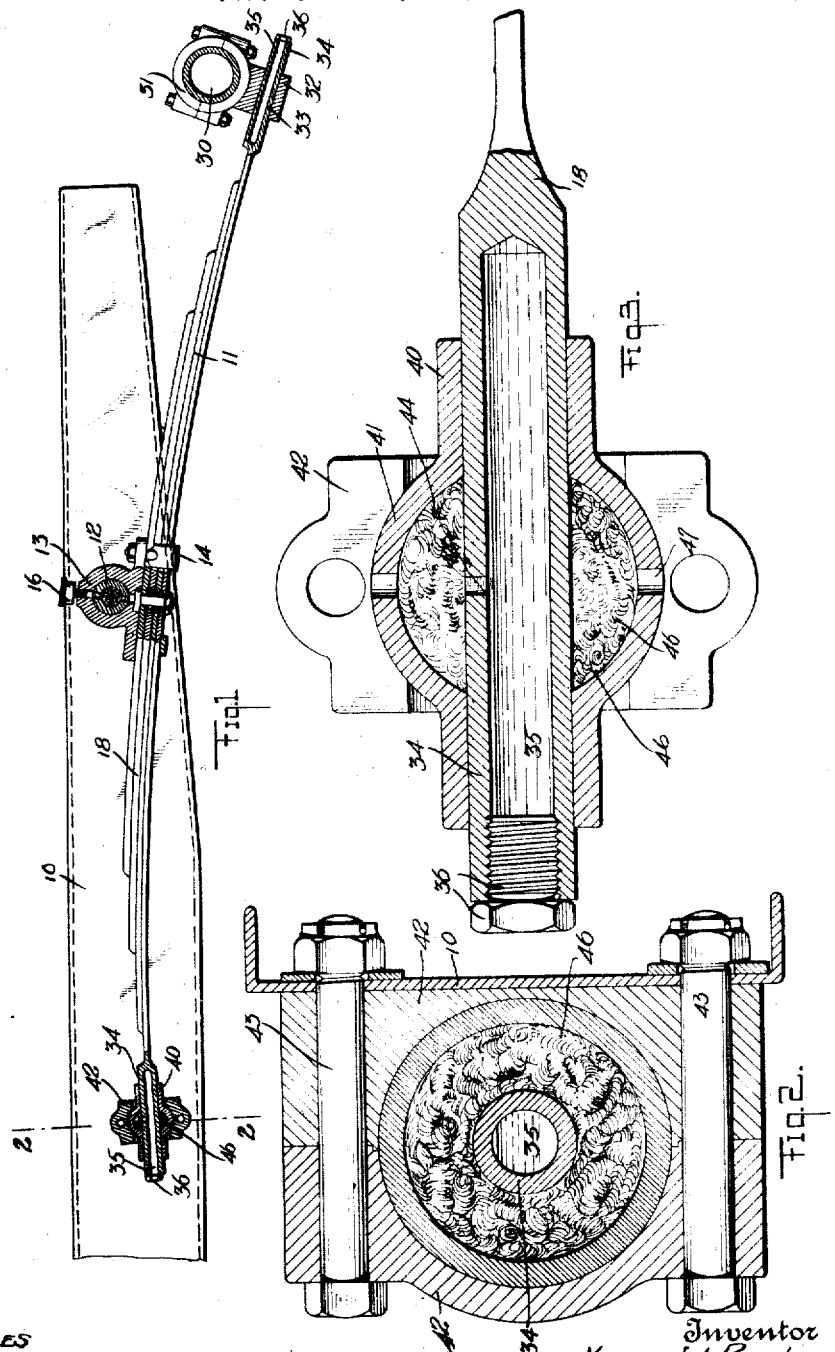

1,461,672

UNITED STATES PATENT OFFICE.

VICTOR W. PAGÉ, OF KEW GARDENS, NEW YORK, N. Y.

SPRING MOUNTING.

Application filed June 18, 1921. Serial No. 478,597.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Spring Mounting, of which the following is a full, clear, and exact description.

The present invention relates to new and useful improvements in vehicle spring suspensions and it pertains more particularly to a new and novel construction of mounting and connecting springs particularly of the so-called cantilever type.

It is one of the primary objects of the invention to provide new and novel means for connecting th spring to the several points of attachment at its ends.

It is another object of the invention to provide a new and novel form of center bearing and attaching means for springs of the above mentioned type.

It is a further object of the invention to provide a new and novel form of spring whereby the lubrication of the spring is greatly facilitated and more effectively carried out.

It is a still further object of the invention to so connect the spring to the several parts that it will have a more or less universal movement at the points of connection or attachment.

Referring to the drawings,

Figure 1 is a view in side elevation partly in section of the rear portion of one side of a vehicle showing the cantilever spring and its attachment to said vehicle;

Fig. 2 is a sectional view taken on the line 2—2 of Fig. 1;

Fig. 3 is a detail longitudinal sectional view showing the front spring bearing in enlarged detail section;

Figure 4:
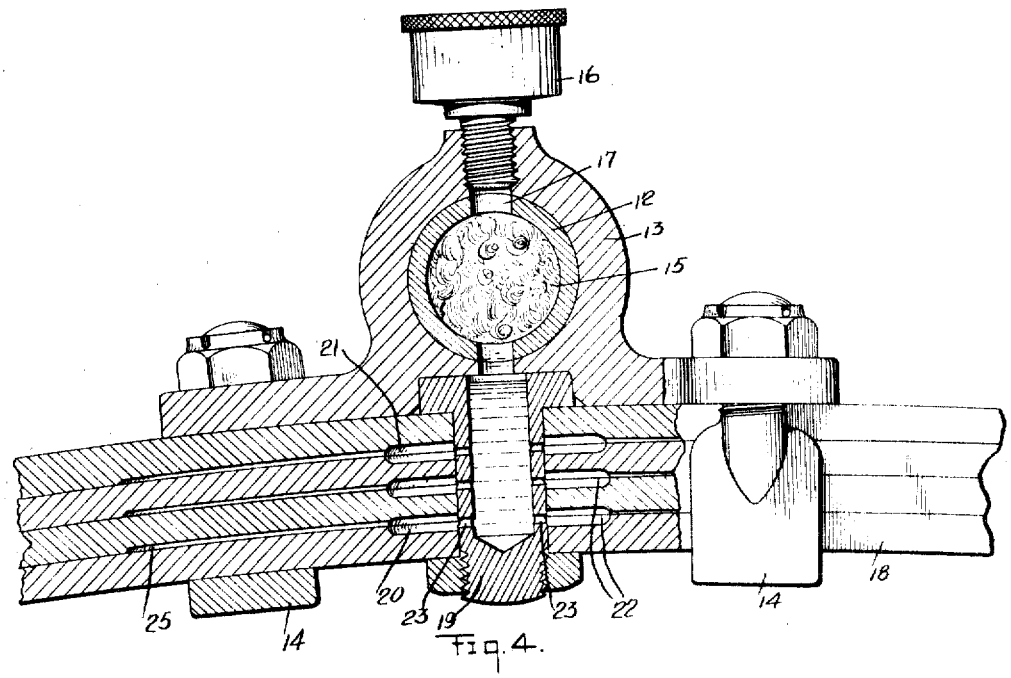
Fig. 4 is a sectional view on an enlarged scale of the center bearing of the spring.
Figure 5:
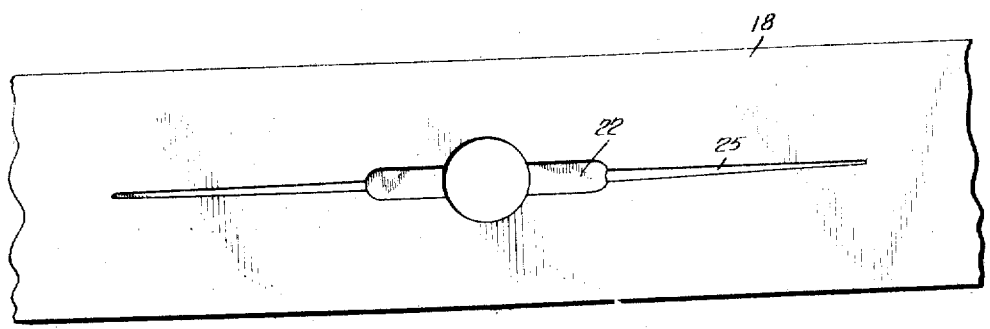
Fig. 5 is a bottom plan view of one of the leaves going to make up the spring.

Referring more particularly to the drawings, the reference character 10 designates one of the side frames of a vehicle chassis, and 11 designates the spring, which spring is shown of the cantilever type.

Rigidly secured to the side frame 10 and projecting therefrom is a hollow bolt or the like 12, and said bolt forms the supporting means for a bearing 13, to which the spring 11 is secured by means of clips 14 or other suitable means. This hollow bolt 12 and bearing 13 form the means for connecting the center portion of the spring 11 to the frame, and said bearing is so mounted on the bolt 12 as to have free movement thereabout. This center bearing is more clearly shown in Fig. 4, and from said figure, it will be apparent that the hollow bolt 12 is adapted to receive waste or other suitable packing 15.

The reference character 16 designates a suitable lubricant receptacle and said lubricant receptacle is carried by the bearing 13 and is adapted to discharge the lubricant contained therein into the packing 15 of the hollow bolt 12 by means of a passage 17, which passage through one of the walls of the hollow bolt.

The spring 11 comprises a plurality of leaves 18, and said leaves are secured together intermediate of their ends by a hollow bolt 19. The bottom leaf 18 is recessed on its upper face as indicated by the reference character 20, the upper leaf being recessed on its bottom face as indicated by the reference character 21. Each of the intermediate leaves is recessed upon its opposite faces as indicated by the reference character 22. The hollow bolt 19 is provided with a plurality of openings 23 extending through the side walls thereof at such a point as to discharge the lubricant contained within the hollow bolt to the several recesses at the central portion of the spring.

Leading from the recesses 20, 21 and 22 to a point beyond the clips 14, are lubricant ducts 25, by means of which the lubricant is introduced between the several leaves of the spring as they move relatively one to another during the action of the spring in use.

By this construction it is apparent that as the leaves move relatively one to another during the action of the spring, the lubricant will be discharged from the recesses 22 to a point between the leaves by means of the ducts 25.

Referring again to Fig. 1, the reference character 30 designates the rear axle housing and embracing the rear axle housing are clips 31. These clips 31 are provided with a depending extension 32, which in turn has extended therethrough a slot 33.

The lower leaf of the spring has its ends made in tubular form as indicated by the reference character 34 and said tubular ends are hollow as indicated by the reference character 35, said hollow ends being closed by means of removable screw-threaded plugs 36. The rear end of the lower leaf of the spring is adapted for sliding engagement within the slot 33 of the depending portion 32 of the clips 31 in order that relative movement between the rear end of the spring and the rear axle of the vehicle may be had. The hollow portion 35 of the cylindrical end 34 is adapted to contain suitable lubricant and said lubricant is applied to the faces of the opening 33 in any desired manner. The hollow portion 35 may oscillate in the bearing 32 at the same time that it reciprocates.

The front portion of the lower leaf 18 of the spring 11 is formed similarly to the rear end thereof, the mounting, however, being slightly different in that the cylindrical portion 34 of the spring is slidably mounted in a bearing member 40, which bearing member is formed intermediate of its ends with a spherical portion 41. This spherical portion 41 is mounted for rocking movement in bearings 42, said bearings 42 being in turn secured to the side frame 10 by bolts or other suitable fastening means 43. The cylindrical end 34 of the spring is provided with a passage 44 and the spherical portion 41 is packed with suitable lubricant absorbent 46 adapted to take up the lubricant from the lubricant receptacle 35 and discharge the same by way of passages 47 to 48 the bearing surfaces of the spherical portion 41 and the bearings 42.

By this construction it is apparent that a cantilever spring construction is provided in which all of the points of suspension will have a free movement, the central point having a free pivotal movement and the rear point having a free sliding and oscillating movement. Furthermore, the construction provides for thorough lubrication of all points of attachment in such a manner that the lubricating operation may be reduced to a minimum, and, at the same time, the spring will at all times be properly supplied with lubricant.

I claim:

1. A vehicle spring comprising a plurality of leaves, one of said leaves having its end made in tubular form and hollowed out to provide a lubricant receptacle.

2. A vehicle spring comprising a plurality of leaves, one of which has its ends made in tubular form to provide for slidingly mounting the spring, said tubular end being hollow to provide a lubricant receptacle.

3. An attaching means for springs of vehicles comprising a plurality of bearing blocks rigidly carried by the frame of the vehicle, a bearing mounted for universal movement in said bearing blocks, and a spring mounted for sliding movement in said bearing, said spring having a cylindrical hollow end forming a lubricant receptacle whereby lubricant is fed to the sliding bearing and the universal bearing, substantially as described.

VICTOR W. PAGÉ.